United States Patent
Cheung et al.

(10) Patent No.: US 7,382,381 B2
(45) Date of Patent: Jun. 3, 2008

(54) GRAPHICS TO VIDEO ENCODER

(75) Inventors: Gene Cheung, Musashino (JP); Wai-tian Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 10/970,915

(22) Filed: Oct. 22, 2004

(65) Prior Publication Data

US 2006/0088220 A1 Apr. 27, 2006

(51) Int. Cl.
G09G 5/00 (2006.01)
G06K 9/36 (2006.01)
G06K 9/46 (2006.01)

(52) U.S. Cl. ............... 345/634; 382/100; 382/238
(58) Field of Classification Search ............ 345/634; 382/100, 238
See application file for complete search history.

(56) References Cited

U.S. PATENT DOCUMENTS

| | | | |
|---|---|---|---|
| 6,377,309 B1 * | 4/2002 | Ito et al. | 348/554 |
| 6,411,725 B1 * | 6/2002 | Rhoads | 382/100 |
| 6,614,936 B1 * | 9/2003 | Wu et al. | 382/238 |
| 6,909,747 B2 * | 6/2005 | Bordes et al. | 375/240.12 |
| 6,956,972 B2 * | 10/2005 | Wu et al. | 382/238 |
| 6,970,506 B2 * | 11/2005 | Kim et al. | 375/240.01 |
| 7,050,603 B2 * | 5/2006 | Rhoads et al. | 382/100 |
| 7,076,097 B2 * | 7/2006 | Kondo et al. | 382/190 |
| 7,093,028 B1 * | 8/2006 | Shao et al. | 709/240 |
| 7,130,473 B2 * | 10/2006 | Wu et al. | 382/238 |
| 7,227,567 B1 * | 6/2007 | Beck et al. | 348/14.07 |

* cited by examiner

*Primary Examiner*—Jin-Cheng Wang (57) ABSTRACT

A graphics to video encoder is disclosed. The encoder comprises a client image constructor that receives client input and constructs client image frames based on the client input. A scene integrator is coupled to the client image constructor. The scene integrator accesses base image frames and integrates client image frames with base image frames to generate client scene frames. The graphics to video encoder also has coupled to the scene integrator a video encoder that encodes and outputs the client scene frames as a video bitstream.

25 Claims, 5 Drawing Sheets

GRAPHICS TO VIDEO ENCODER

FIELD OF THE INVENTION

Embodiments of the present invention relate to the field of video encoding. More specifically, embodiments of the present invention relate to integrating an image based on client input with a graphical image.

BACKGROUND OF THE INVENTION

A wide array of mobile clients, such as personal digital assistants (PDAs) and cellular telephones, include a display screen for displaying streaming video content. With the expanded bandwidth of wireless networks (e.g., 3G wireless networks), it was believed that streaming video would occupy the vast majority of wireless media. However, the fastest-growing applications have instead been in the arena of mobile network games based on three-dimensional (3D) graphics models. For instance, in countries such as Korea and Japan, the use of mobile network games has increased such that there is a substantial desire to access mobile network games using mobile electronic devices.

Mobile network games require real-time interactivity, which demands high-volume and timely delivered data. This is a difficult task for the current 3G wireless network real-time mechanism. Moreover, typical mobile clients are low-powered lightweight devices with limited computing resources; therefore, they lack the ability to render the millions of triangles per second typically necessary for high quality graphics. As a result, current mobile online games are typically limited in group size and interaction, and are simplistic in visual quality.

In order to improve the quality of mobile online games, a fundamental advance in wireless network technology and a drastic speedup in mobile computing hardware are required. However, game observers comprise a large and growing set of mobile client users. Game observers are users that access network games as non-participants who are interested only in viewing the action. As network games mature, highly skilled players acquire fan bases that loyally follow and observe their heroes in action en masse in multicast channels.

Currently, mobile network game observers are subject to the same limitations as active game participants. Specifically, in order to observe a network game, the observer's mobile client typically must meet the hardware requirements necessary to display 3D graphics. However, as describe above, typical mobile clients do not include hardware capable of rendering high-quality 3D graphics. Accordingly, mobile game observers are limited to viewing mobile online games, which are often less compelling and have simplistic graphics, and therefore less desirable to observe.

SUMMARY OF THE INVENTION

A graphics to video encoder is disclosed. The encoder comprises a client image constructor that receives client input and constructs client image frames based on the client input. A scene integrator is coupled to the client image constructor. The scene integrator accesses base image frames and integrates the client image frames with the base image frames to generate client scene frames. The graphics to video encoder has a video encoder coupled to the scene integrator. The video encoder encodes and outputs the client scene frames as a video bitstream.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

A method, system, and device to integrate client input derived images with graphics images is disclosed. In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Aspects of the present invention may be implemented in a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for commnunicating information and command selections to the processor, and an optional user input device such as a cursor control device (e.g., a mouse) for communicating user input information and command selections to the processor.

Figure 1:
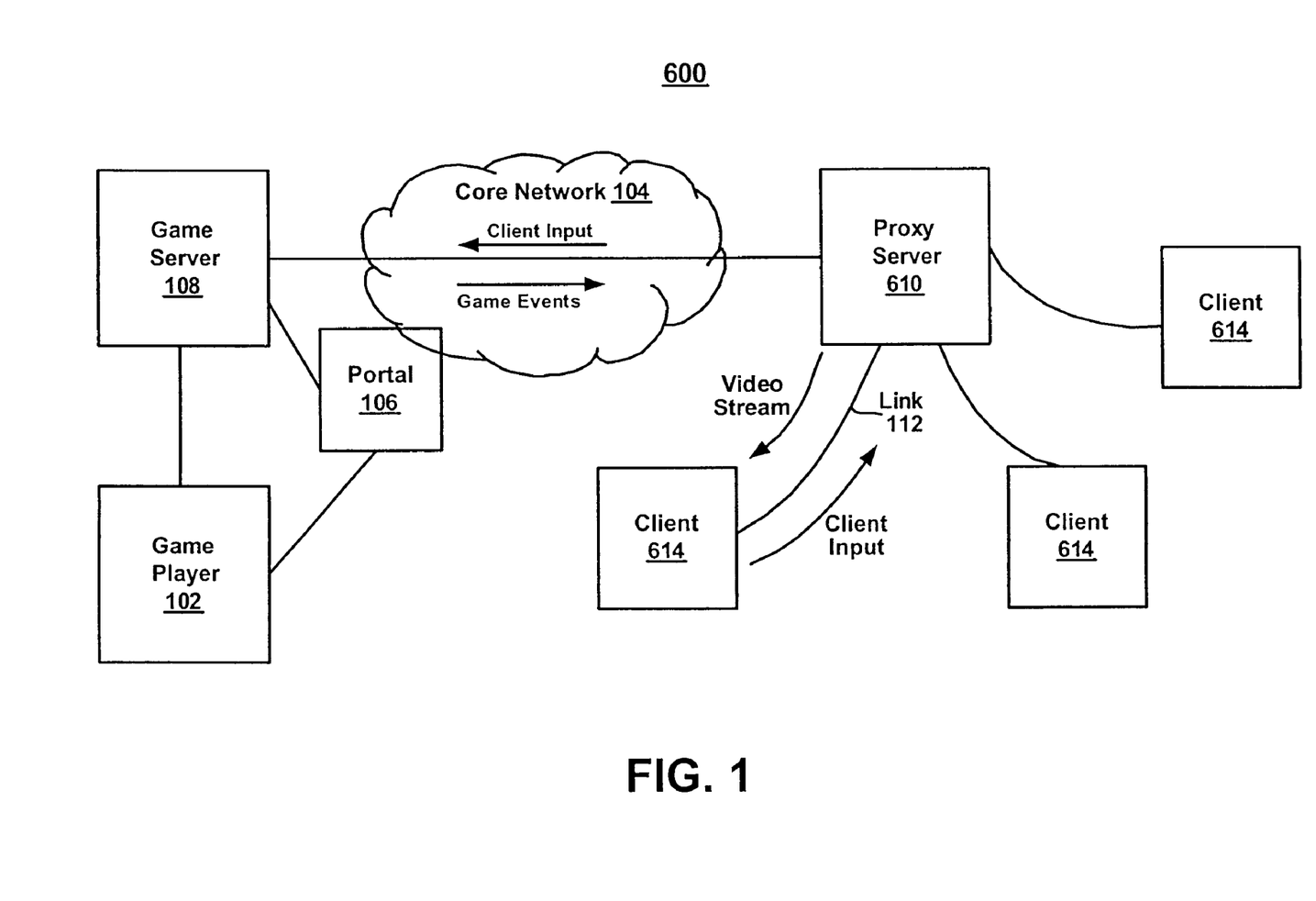
FIG. 1 is a game observer video encoding and mobile network with client input, in accordance with an embodiment of the present invention.

FIG. 1 illustrates a block diagram of a game observer video encoding and mobile network 600 (hereinafter referred to as network 600), in accordance with an embodiment of the present invention. Network 600 includes core network 104 and communication link 112. The communication link 112 may be a wireless communication link, although this is not a requirement. Core network 104 includes game player 102, portal 106, game server 108 and proxy server 610. Game player 102 may be connected to core network 104 using either a wired or wireless connection. In one embodiment, game player 102 acquires permission and registers for an online game via portal 106. Game player 102 then participates in the game in a server-client model via game server 108.

Game server 108 is operable to provide three-dimensional (3D) graphics game play (e.g., games using 3D models) to game player 102. Game server 108 sends updated game events to game player 102 as well as to proxy server 610. It should be appreciated that any number of game players 102 may access core network 104.

Proxy server 610 is a computer system for converting updated game events to an encoded bit stream. In addition to video content, the bitstream transmitted by the proxy server 610 may comprise audio content. In one embodiment, the bitstream is streamed to interested clients 614 using communication link 112. However, any method or technique for transmitting wireless transmission of data maybe used. In one embodiment, mobile multicast support 112 utilizes a 3G wireless standard, and includes a Gateway GPRS (General Packet Radio Service) Support Node (GGSN), a Serving GPRS Support Node (SGSN), a plurality of UMTS (Universal Mobile Technology System) Terrestrial Radio Access Network (UTRAN) nodes, and a plurality of user equipment (UE) for transmitting the bit stream to clients 614. However, any wireless standard may be used. In one embodiment, the user equipment is a mobile client. In one embodiment, the mobile client is a personal digital assistant. In another embodiment, the mobile client is a cellular telephone.

The client node 614 may be a device with wireless capability. Many wireless devices, such as wireless handsets and devices do not have rendering engines or have rendering engines with limited processing capability. Thus, by performing the graphical rendering at the proxy server 610, the client node 614 is able to display a higher quality video display than if rendering were attempted at the client node 714.

By being an inactive game observer receiving streaming video (and audio) of game action instead of an active game player, the complexity of rendering millions of triangles per second is pushed back to the game server and proxy server, which are much more capable of performing the rendering and then the graphics-to-video conversion. The result is that the game observer can enjoy high visual quality, in some cases even higher quality than the game players themselves.

Embodiment of the present invention provide a method, device, and system that integrate an image based on client input with a base image prior to video encoding. The proxy server 610 can receive client input from one or more client nodes 614 and generate two-dimensional client video frames based thereon. These client frames are integrated with two-dimensional frames generated by the proxy server 610 based on events from the game server 108. For example, the content of one of the client frames is integrated with the content of one of the game server frames, then a second of each, etc. The resulting integrated frames are encoded and transmitted to the client nodes 614 in the video bitstream.

As an illustration of client input, the client nodes 614 are allowed to provide comments and the like, which may affect the presentation of the game being observed by client 614. For example, the client input may be comments commonly referred to as "heckling". These heckling comments can be viewed by many client nodes 614. The game player 102 is typically not aware of the client input; however, the client input can be presented to the game player(s). Thus, the clients 614 can enjoy a limited level of interactivity while retaining the benefit of high quality graphics of the video streaming presented herein.

Figure 2:
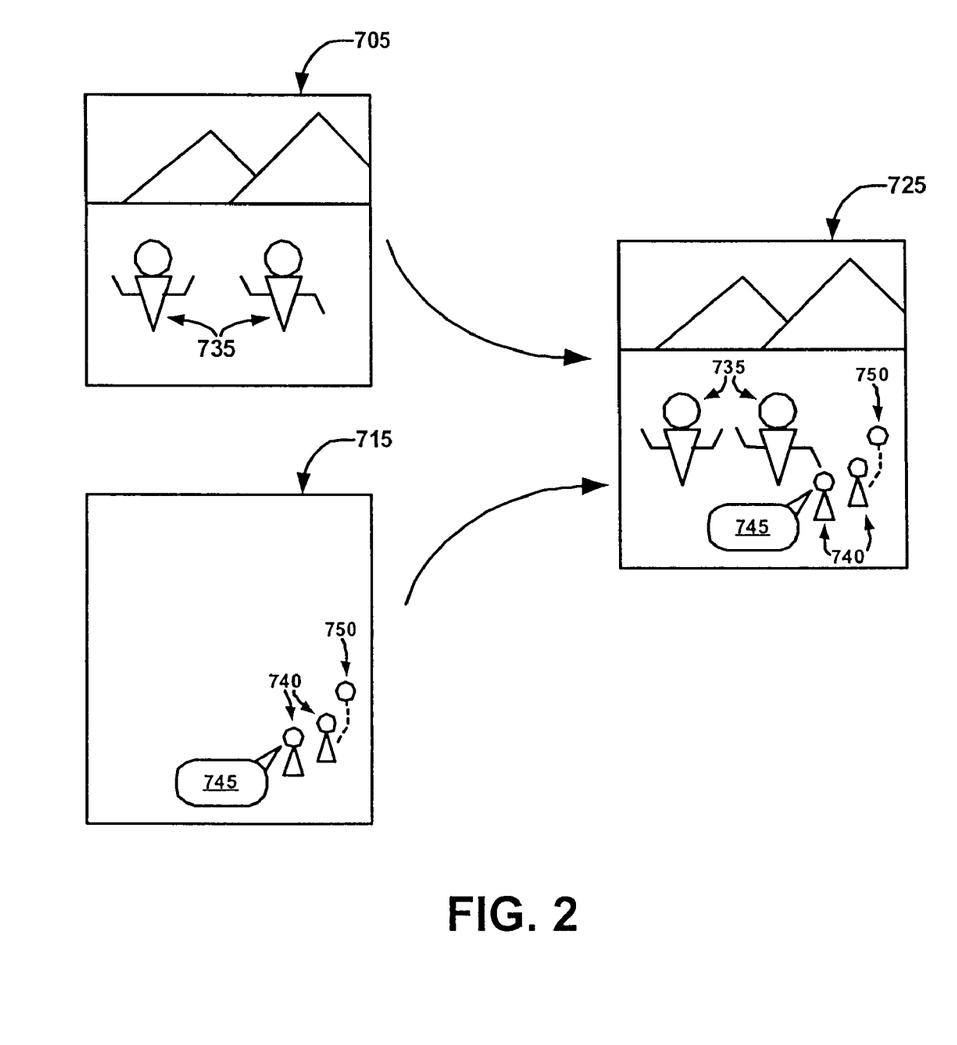
FIG. 2 is a diagram illustrating integrating images, in accordance with an embodiment of the present invention.

FIG. 2 illustrates exemplary images that are integrated, in accordance with an embodiment of the present invention. Referring to FIG. 2, base image 705 is integrated with client image 715 to form client scene 725. The base image 705 may be a two-dimensional frame generated by a rendering unit. For example, the base image 705 may depict a scene from a game without any added information based on client input. The base image 705 has players 735 in this example and may be generated by the proxy server 610 based on game events received from the game server 108.

The client image 715 is generated by a rendering unit based on client input. Exemplary client inputs are text messages, and instant messages. The client image 715 comprises client icons 740, in this embodiment. There is also a text box 745, which is based on client input. The text box 745 is generated from a text message in one embodiment. The client icons 740 can be made to perform various actions, such as move around or throw objects 750. For example, the client input may be a message whose content is "jump." The client icons 740 are rendered as jumping in a series of frames in the client image 715, in response to this client input. These frames are then integrated with a series of frames in the base image 705.

The integration of the frames generated from the client nodes is non-time-critical. By non-time-critical, it is meant that the frames client image 715, which are generated based on the client input, do not have to be integrated with particular frames of the base image 705. For example, the client may make a comment based on his/her observation of the game being streamed to the client. It is not critical when in time the client comments get integrated into the game. For example, there may be a delay between the time the client input is sent by the client node to the proxy server 610 and the time that the proxy server 610 incorporates the effect of the client comments into the video stream sent back to the client.

The integration of the frames generated from the client nodes may be intrusive or non-intrusive. By non-intrusive it is meant that the clients' input does not affect other elements in the base image. For example, if the base image is a game environment, the client input is purely additive to the rest of the scene composition. Referring to FIG. 2, the client image 715 is non-intrusive in that the client image is additive to the scene from the base image 705.

An embodiment of the present invention provides for intrusive client input. In this case, the client input alters the base image. For example, the client input does affect elements in the game environment. In the intrusive case, typically a central authority such as the game server determines the consequence of the intrusive actions. As an illustration, the clients might vote for their preferred game player. The results can be used to alter the base image 705 by, for example, causing a player 735 to fall down.

Referring again to FIG. 1, the proxy server 610 may pass a portion of the client input on to the game server 108. The game server 108 uses the client input to impact the game in same way. Thus, the client input may impact the game events. This is an example of intrusive client inputs.

While the proxy server 610 and gamer server 108 are depicted as separate components, their functions can be incorporated into a single server. Having a separate proxy server 610 allows offloading of load from the game server 108, and also improves scalability to large number of viewers. For instance, if there is a game with two players and 1000 viewers, it is possible to use a single game server 108, and 50 proxy servers 610, each of which will handle client input of 20 client nodes 614.

When multiple proxy servers 610 are used, each may receive identical input from the game server 108. Each proxy server 610 then handles their respective client input and integrates those client inputs with the game events before generating the video stream.

Further, the proxy server 610 can keep track of which client nodes 614 wish to be grouped together. For example, a group of users may want to share the experience. Thus, the client input from one client node 614 may be viewed by another client node 614. The proxy server 610 may combine the client input from multiple client nodes 614 and generated a common video stream therefrom.

Figure 3:
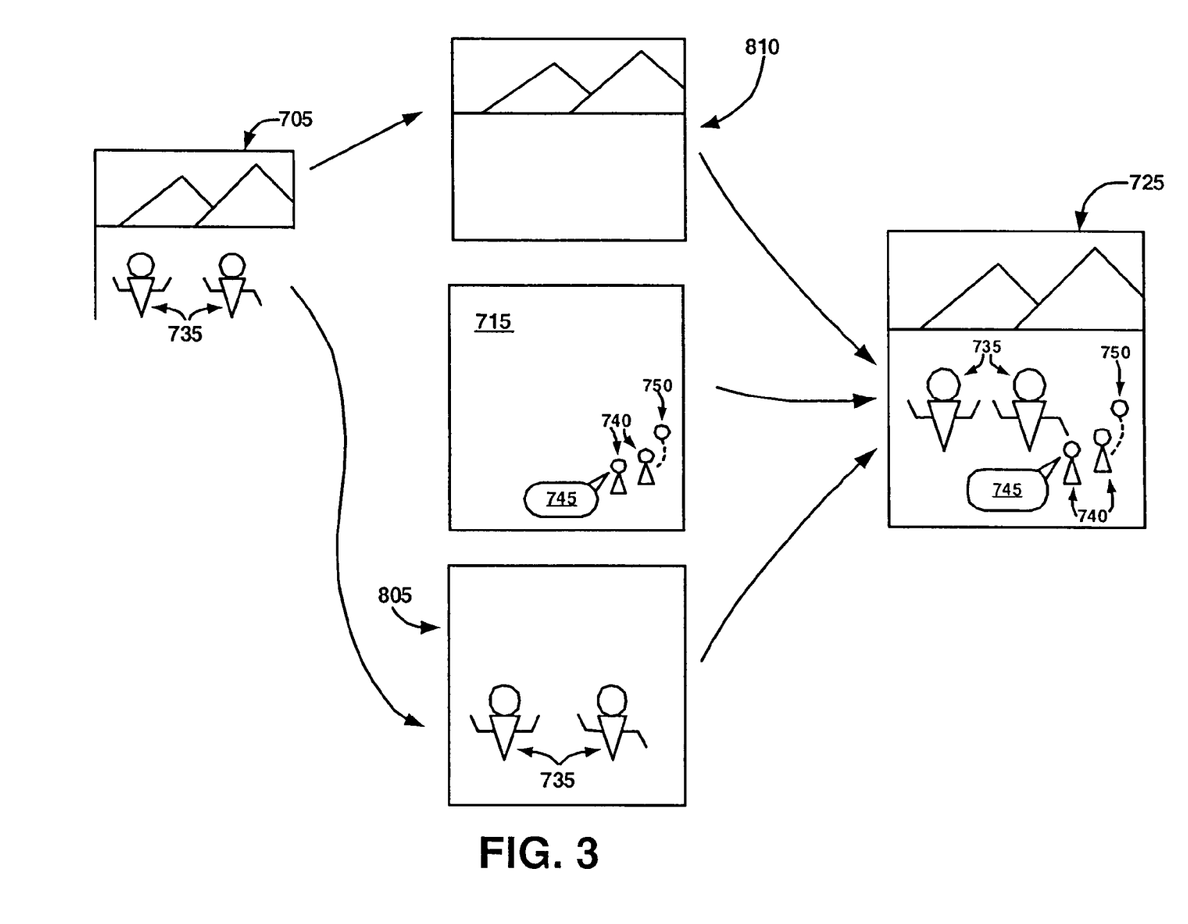
FIG. 3 is a diagram illustrating layers involved when integrating images, in accordance with an embodiment of the present invention.

FIG. 3 is a diagram illustrating layers used in the integration of a base image 705 and a client image 715, in accordance with an embodiment of the present invention. The base image 705 can be considered to have a background layer 810 separate from an active polygon layer 805. In one embodiment, the proxy server separates the base image 705 into an active layer 805 and a background layer 810. In another embodiment, the game server 108 provides a separate background image 810 and base image 705 to the proxy server 610. For example, some games provide background information at the start of the game to reduce the amount of data needed to be transferred during game play.

In some embodiments, the client image 715 is rendered at a depth between the active polygon layer 805 and the background layer 810. This is referred to herein as depth-multiplexing the client image 715, active polygon layer 805, and the background layer into a single client scene 725. However, it will be appreciated that it is not required that the images (715, 805, 810) are depth-multiplexed. For example, the depths at which the various images are rendered in the client scene may overlap.

In one implementation, the active layer 805, which is typically foreground, is differentiated (e.g., separated) from the background layer 810 by selecting a depth value "d" such that "x" percent of rendered objects have depths less than "d." A suitable value of "x" may be determined by an analysis of the depth values extracted from data used to render the frames. Alternatively, the value of "x" may be pre-determined. The objects in the base image 705 having relatively low depth values may be assumed to be active layer 805 objects. The remaining objects may be assumed to be background layer 810 objects. The objects in the client image 715 may be rendered at a depth between the active layer objects and background layer objects.

However, it is not required that the base image 705 be divided between an active polygon layer 805 and a background layer 810. In one implementation, the client icons 740, objects 750, and other information in the client image 715 are rendered in the client scene 725 as ghost images. For example, they are rendered as semi-transparent characters such that they would not obliquely cover information derived from the active polygon layer 805.

Some games provide one or more background images 810 separate from the active polygon layer 805 prior to start of game play. Referring to FIG. 3, the proxy server would receive one or more background images 810 at the start of game play and receive game updates to construct the active polygon layer 805. In this case, the proxy constructs the base image 705 from the background layer 810 with the active polygon layer 805. More specifically, the proxy server would select an appropriate background layer 810 based on information provided to the proxy server during game play. To form the client scene 725 in this embodiment, the background layer 810 may be assigned a value of the maximum depth. Therefore, to put the client image 715 in front of the background layer 810 but behind the active polygon layer 805, objects in the client image 715 can be assigned depth values of starting one less than the maximum depth. It will be understood that the objects in the client image 715 may have a range of depth values. With these depth values assigned to the background layer 810 and the client image 715, the client scene 725 with the active polygon object in front of the client image objects is achieved.

Various embodiments of the present invention can flexibly locate the client image 715 in the client scene 725 such that objects in the client image 715 are not completely covered by the foreground (e.g., active layer 805). It will be appreciated that the client image 715 may be rendered in front of the active polygon layer 805, if desired.

Figure 4:
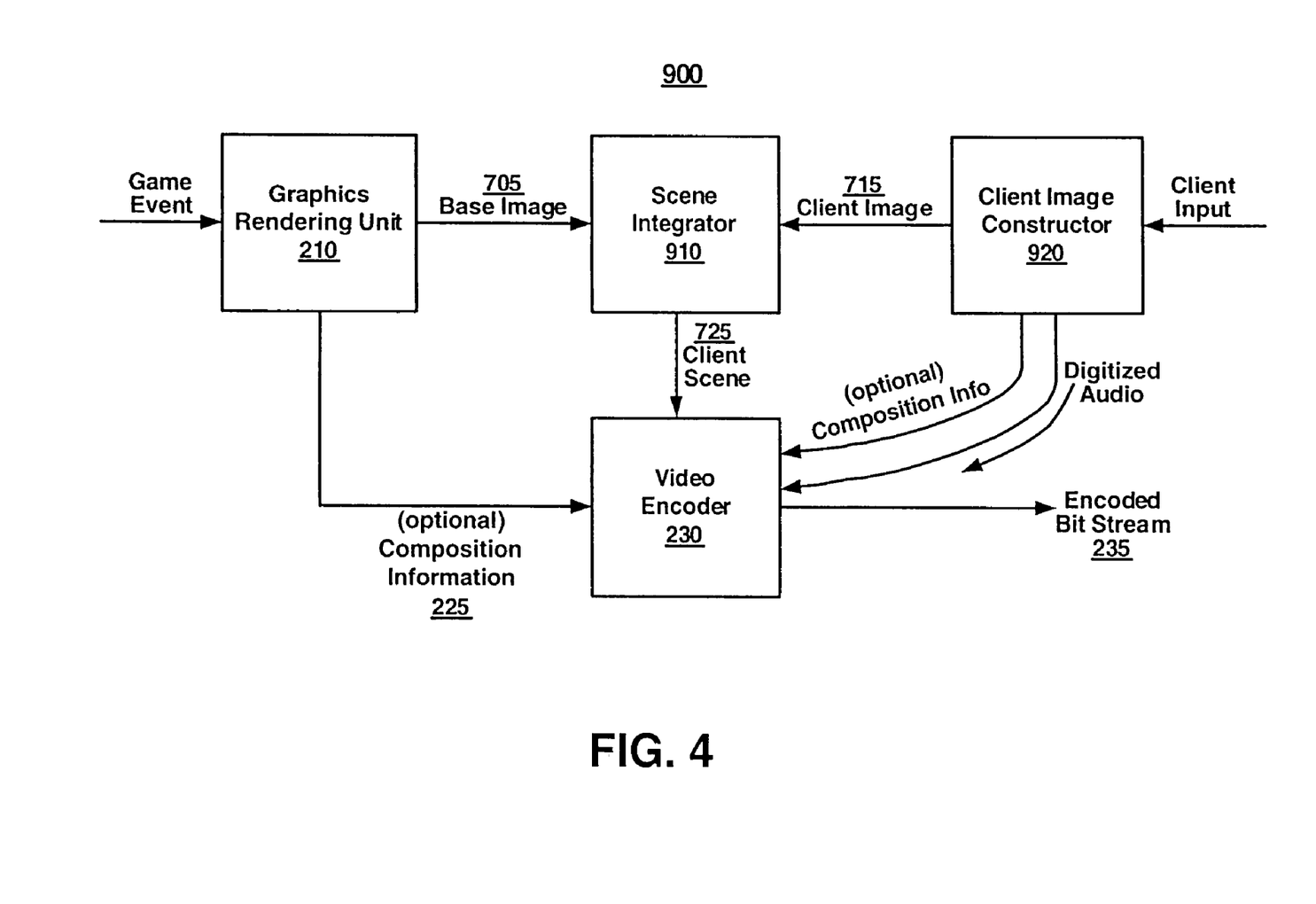
FIG. 4 is a block diagram of a graphics-to-video encoder, in accordance with an embodiment of the present invention.

FIG. 4 is a block diagram of a graphics-to-video encoder 900, in accordance with an embodiment of the present invention. The encoder 900 may be used in the proxy server 610 of FIG. 1. The client image constructor 920 receives client inputs and generates client image frames 715 therefrom. The client image constructor 920 is able to interpret a client input such as "jump" to construct a character in a series of frames in the client image 715 that is jumping. The client image constructor 920 may be implemented in a graphics-rendering engine.

The client image constructor 920 may comprise a composition information extractor (not depicted in FIG. 4). Details of a compositional information extractor are described in co-pending U.S. patent application Ser. No. 10/942,357, filed Sep. 15, 2004, entitled "A Method and Device for Three-Dimensional Graphics to Two-Dimensional Video Encoding," by Cheung et al., and assigned to the assignee of the present invention and incorporated herein by reference. A compositional information extractor may extract depth values information used to construct the client image 715. It will be appreciated that the compositional information extractor would not typically extract information directly from the client input. Further, it will be appreciated that the compositional information extractor is not a requirement for determining depth information.

The graphics-rendering unit 210 renders frames of base image 705 based on game events. Graphics rendering unit 210 may receive a 3D model from a server (e.g., game server 108 of FIG. 1). Graphics rendering unit 210 renders a 3D representation of objects of the 3D model onto a 2D plane, generating raw two-dimensional (2D) frames (215). The rendering is also referred to as rasterization. In one embodiment, this is performed in a frame buffer of graphics rendering unit 210.

The scene integrator 910 combines the content of a frame of the base image 705 with a frame of the client image 715 to form a frame of client scene 725, which is input into the video encoder 230.

The video encoder 230 converts the raw frames of client scene 725 into compressed video for video streaming to the interested client nodes. The bit stream is subsequently packetized and sent to the interested observers (e.g., client nodes 614 of FIG. 1). It should be appreciated that video encoder 230 may be any standard compliant video encoder, such as a Moving Pictures Experts Group (MPEG) video encoder.

Audio information may also be added to the encoded bit stream 235, based on the client input. For example, the client layer constructor 920 may generate a digitized audio signal based on client input. The digitized audio signal can be input to the video encoder, which incorporates the digitized audio signal into the encoded bitsteam, or it can be sent as separate media stream, along with the video stream, to the client(s).

The video encoder 230 can use the composition information from the client image constructor 920 and/or the game-rendering unit 210 for more efficient video encoding and/or streaming. In one embodiment, the composition information includes depth values. It should be appreciated that the composition information may include other factors, including but not limited to: motion, texture, shape, fog, lighting, and other semantic information. In one embodiment, composition information 225 is transmitted to video encoder 230 to improve the visual quality of regions of interest. In another embodiment, client image constructor 920 generates a weighting factor based on the composition information 225 for identifying a region of interest. The weighting factor is then transmitted to video encoder 230 to improve the visual quality of regions of interest.

While depicted as separate blocks, it will be appreciated that the functionality of some of the blocks in FIG. 4 may be performed by a single component. For example, the graphics rendering unit 210 and the client image constructor 920 may be implemented with a single graphical rendering component.

As previously discussed, the client image 715 may be constructed from client information from multiple client nodes. In this case, the objects in the client image 715 relate to client input that was received at different points in time. Thus, some objects in the client image 715 relate to recent client input, while other objects relate to older client input. If the client input is heckling, the recent client input can be defined as an active heckler and the older input as a silent, heckler. In order to improve image quality, more bits can be allocated to active hecklers than silent heckler at any given time. Further, if the amount of scene activity is large, as determined by the average of the magnitude of the motion vectors in a frame during video encoding, more bits can be allocated to the foreground as opposed to the hecklers.

Figure 5:
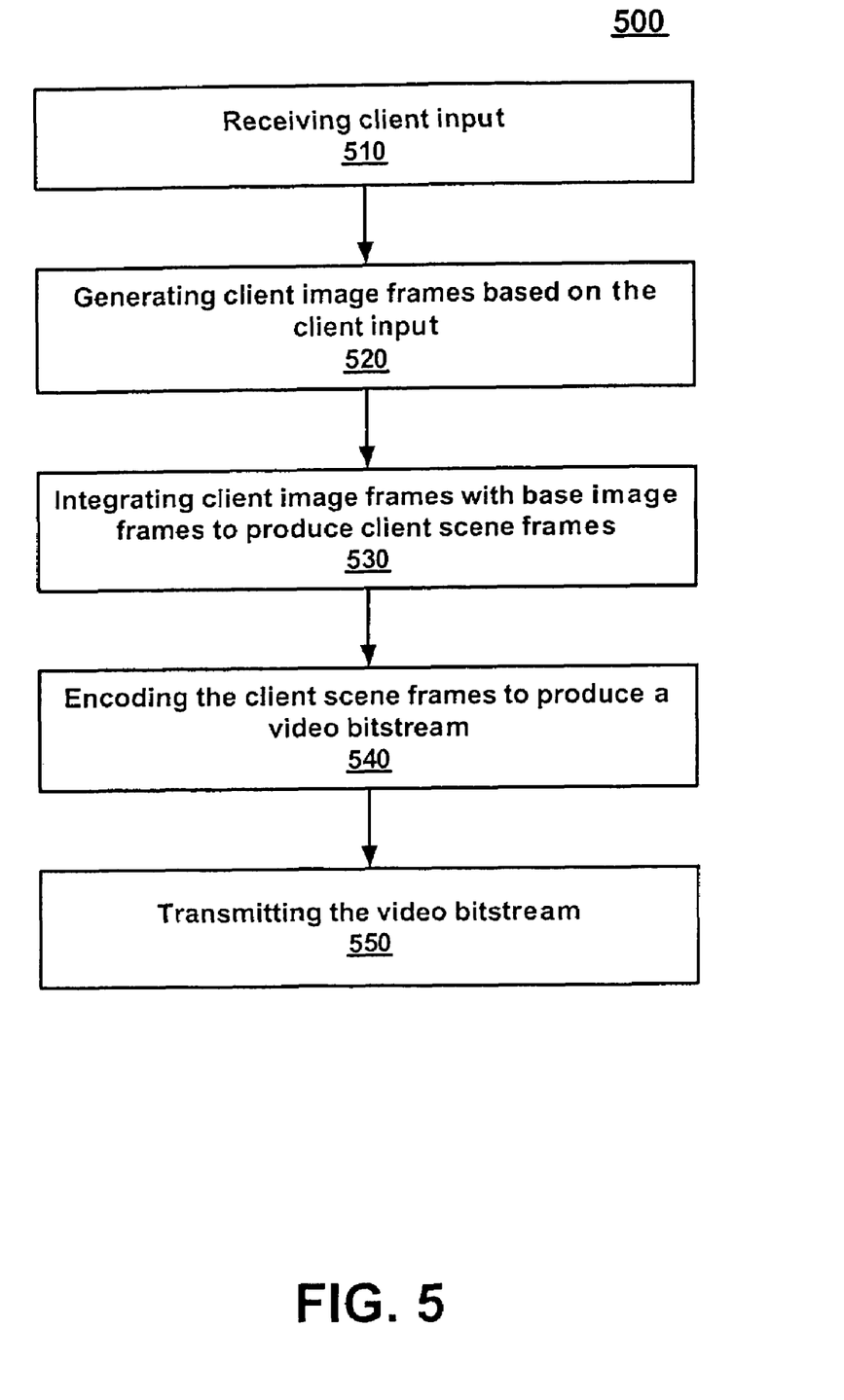
FIG. 5 is a flowchart illustrating steps of a process of integrating client input into a graphics based image, in accordance with an embodiment of the present invention.

FIG. 5 is a flowchart illustrating steps of a process 500 in accordance with an embodiment of the present invention. Step 510 is receiving client input. For example, a proxy server receives client input from a client node over a wireless communication link.

Step 520 is generating client image frames based on the client input. For example, a client image constructor 920 generates a client image 715 based on the client input. The client input may be, but is not limited to, text messages and instant messages.

Step 530 is integrating client image frames with base image frames to produce client scene frames. The integration is performed on a frame-by-frame basis. For example, one client image frame is integrated with one base image frame to produce one client scene frame. The base image may be from a game; however, the base image is not so limited.

Step 540 is encoding the client scene frames to produce a video bitstream. For example, a video encoder 230 converts raw frames of client scene into compressed video for video streaming to the interested client nodes. The bit stream may be packetized.

Step 550 is transmitting the video bitstream. For example, the bitstream is sent to the client nodes (e.g., 614 of FIG. 1). The video bitstream may be sent on a wireless communication link, although this is not required.

Thus, embodiments of the present invention, integrating a graphic image with an image based on client input, is thus described. While the present invention has been described in particular embodiments, it should be appreciated that the present invention should not be construed as limited by such embodiments, but rather construed according to the below claims.

What is claimed is:

1. A graphics to video encoder, comprising:
    a client image constructor that receives client input and constructs client image frames based on the client input;
    a scene integrator coupled to the client image constructor and accessing base image frames, each of said base image frames based upon a three dimensional model of a game event received from a server, and integrating ones of the client image frames with ones of the base image frames to generate client scene frames; and
    a video encoder coupled to the scene integrator and that encodes and outputs the client scene frames as a video bitstream.

2. The encoder of claim 1, further comprising a graphics-rendering unit coupled to the scene integrator and that outputs the base image frames.

3. The encoder of claim 2, wherein the graphics-rendering unit receives game events and generates said base image frames comprising game scenes.

4. The encoder of claim 1, wherein said client input comprises a text message.

5. The encoder of claim 1, wherein said client input comprises an instant message.

6. The encoder of claim 1, wherein said client input comprises audio content.

7. The encoder of claim 1, wherein said client image constructor bases said client image frames on client input from multiple client nodes.

8. The encoder of claim 1, wherein said scene integrator separates said base image frames into background frames and active polygon layer frames.

9. The encoder of claim 8, wherein said scene integrator depth-multiplexes said background frames, said active polygon layer frames, and said client image frames into said client scene frames.

10. A method of integrating client input into a graphics based image, comprising:
    receiving client input;
    generating client image frames based on said client input;
    integrating ones of said client image frames with ones of base image frames to produce client scene frames, wherein each of said base image frames is based upon a three dimensional model of a game event received from a server;
    encoding said client scene frames to produce a video bitstream; and
    transmitting said video bitstream.

11. The method of claim 10, further comprising separating said ones of said base image frames into background frames and active polygon layer frames.

12. The method of claim 11, wherein said integrating comprises multiplexing respective ones of said background frames, said active polygon layer frames, and said client image frames based on depth values.

13. The method of claim 10, wherein said video bitstream is a compressed video stream.

14. The method of claim 10, wherein said client input is received from multiple client nodes and said video bitstream is transmitted to said multiple client nodes.

15. The method of claim 10, wherein said client input comprises a text message.

16. The method of claim 10, wherein said client input comprises an instant message.

17. The method of claim 10, wherein said client input comprises audio data.

18. The method of claim 10, wherein said client input is received via a wireless communication link.

19. A system for forming and transmitting a video bitstream, said system comprising:

a first server that generates three-dimensional graphics; and a second server coupled to the first server and comprising:

a client image constructor that receives client input and constructs client image frames based on the client input;

a graphics-rendering unit that generates base image frames based on the three-dimensional graphics of a game event received from said first server;

a scene integrator coupled to the client image constructor and the graphics-rendering unit, said scene integrator integrating ones of the client image frames with ones of the base image frames to generate client scene frames; and a video encoder coupled to the scene integrator and that encodes and outputs the scene frames as a video bitstream.

20. The system of claim 19, wherein said second server is configured to transmit said video bitstream via a wireless communication link.

21. The system of claim 19, wherein said second server is configured to communicate with a mobile client node.

22. The system of claim 21, wherein said mobile client is a personal digital assistant.

23. The system of claim 21, wherein said mobile client is a cellular telephone.

24. The system of claim 19, wherein said server is a game server.

25. The system of claim 19, wherein said second server is configured to transfer a portion of said client input to said first server and said first server is configured to base said three-dimensional graphics on said portion of said client input.

* * * * *